Patented July 1, 1941

2,247,482

UNITED STATES PATENT OFFICE 2,247,482

HALOGENATED ACETAL

Joseph B. Dickey and James B. Normington, Rochester, N. Y., assignors to Eastman Kodak Company, Rochester, N. Y., a corporation of New Jersey No Drawing. Application June 10, 1938, Serial No. 213,027

6 Claims. (Cl. 260—345)

This invention relates to halogenated mixed acetals having groups of unlike types on each branch of the acetal configuration.

Halogenated acetals have been employed as intermediates for the preparation of useful compounds such as acetals. However, previously the possibilities in the preparation of new and valuable compounds from halogenated acetals has been rather limited due to the similarity of the type of the groups on each branch of the acetal fork of the compound. No one has previously recognized that groups, different as to type and kind, could be present on the two branches and that compounds of new and valuable properties could be prepared therefrom.

One object of our invention is to provide halogenated acetals which contain groups unlike as to kind on the two branches of the acetal. Another object of our invention is to provide intermediates from which may be prepared new and useful compounds suitable for use as softening agents or plasticizers, pharmaceuticals, dyes, lubricating agents, etc.

We have found that halogenated acetals may be prepared in which one branch presents an alkyl group and the other branch presents a heterocyclic or alkoxyalkyl group, thus allowing much greater latitude in the preparation of useful chemical compounds than was previously considered possible. These halogenated acetals may be prepared by treating $\alpha$-$\beta$-dichloro or dibromo alkyl ether such as $\alpha$-$\beta$-dichloro ethyl-ether with a hydroxy compound of tetrahydrofurfuryl or, of alkoxy alkyl in chemically equivalent amount either alone or preferably in the presence of a suitable base only in sufficient amount to neutralize the HCl or HBr formed in the reaction.

Our halogenated acetals are represented by the following formula:

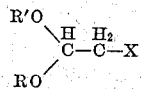

where R is a group, R' is an aryl, heterocyclic or alkoxy alkyl group and X is a halogen atom. The alkyl group may be methyl, ethyl, propyl, butyl or any other alkyl especially one selected from the lower members of the series. Tetrahydrofurfuryl is representative of the heterocyclic groups which may be present in the R' position. The alkoxyalkyl may be methoxy ethyl, methoxy methyl, ethoxymethyl, ethoxy ethyl or in fact alkoxyalkyl groups generally.

The following examples illustrate methods which may be employed to prepare our halogenated acetals:

Example I 232 gms. of $\alpha$-$\beta$-dibromo ethyl ether was added dropwise to 500 gm. of $\beta$-methoxy ethanol containing 84 gm. of sodium bicarbonate. The reaction mixture was warmed to complete the reaction. The salt formed in the mixture was removed by filtering and the reaction product was then distilled off. A compound, having the following formula, was obtained in excellent yield:

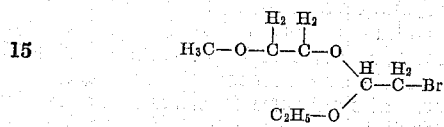

This halogenated acetal $\alpha$-methoxyethoxy-$\beta$-bromoethyl ether boiled at 110°–115° C. at 12 m. m. pressure.

Example II 214 gms. of $\alpha$-$\beta$-dichloroethyl ether was added dropwise to a solution of 34 gm. sodium dissolved in 230 gm. methoxy ethanol, keeping the temperature at 10–15° C. The mixture was stirred at this temperature for 1 hour and then at room temperature for 2 hours. The salt was filtered out and the filtrate was distilled. A halogenated acetal, having the following formula, was obtained in an 80% yield:

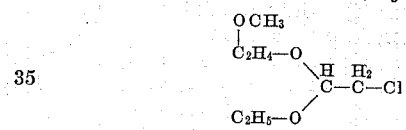

This compound $\alpha$-methoxy ethoxy-$\beta$-chloroethyl ether boiled at 90–95° C. at 12 m. m. pressure.

Example III 66 gms. of potassium hydroxide was dissolved in 300 gms. of tetrahydrofurfuryl alcohol and this solution was added to 143 gms. of $\alpha$-$\beta$-dichloroethyl ether at 10–15° C. After filtration the filtrate was distilled to give the acetal which had the formula:

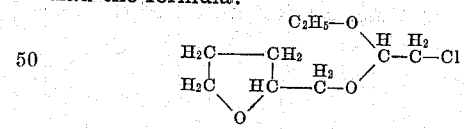

This halogenated acetal $\alpha$-tetrahydrofurfuryloxy-$\beta$-chloroethyl ether, boiled at 118–119° C. at 10 m. m. pressure.

Instead of the alkali metal hydroxides or carbonates, other basic materials may be present in the reaction mixture such as the alkali metal salts of weak acids, ammonia or substituted ammonias, such as pyridine, or alkali metal salts of the alcohols, such as sodium alkoxyethoxide. There need be no base present, although it is desirable that the mineral acid formed in the reaction be neutralized either during the reaction or after it has proceeded, as this facilitates the recovery of the halogenated acetal from the reaction mixture.

To avoid removal of the second halogen substituent of the dichloroethyl ether in the reaction, the amount of alcohol used should be approximately chemically equivalent to the dihalogenated ether and the amount of base should be only enough to neutralize the HCl or HBr which is formed in the reaction.

The halogenated acetals having unlike branches are valuable for the preparation of commerically useful products. Yarn conditioning or softening agents may be prepared therefrom by reacting the halogenated acetal with further alcohol and base or with an alkali metal alkoxide forming an acetal having the formula:

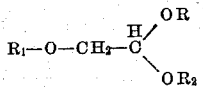

R being alkyl, R₁ being alkyl, heterocyclic or substituted alkyl groups and R₂ being substituted alkyl, heterocyclic or aryl groups. For example, one mole of sodium is dissolved in two moles of ethoxyethanol and this solution is treated while hot with one mole of α methoxyethoxy β-chloroethyl ether. The mixture is stirred and refluxed for four hours. A product, having valuable yarn treating properties, is formed.

Another example of using one of these intermediates to prepare a yarn treating compound is as follows:

1 mol of α-tetrahydrofurfuryloxy-β-chloroethyl ether is dissolved in 4 mols of tetrahydrofurfuryl alcohol and heated on the steam bath. One mol of solid potassium hydroxide is then added in small portions with shaking. Heating is continued for 5 hours to complete the reaction. A product, having valuable yarn treating properties, is formed.

Our mixed halogenated acetals may be employed to form dye intermediates. For instance α-methoxyethoxy β-chloroethyl ether is reacted with ethylaniline in the presence of sodium carbonate in accordance with the following equation:

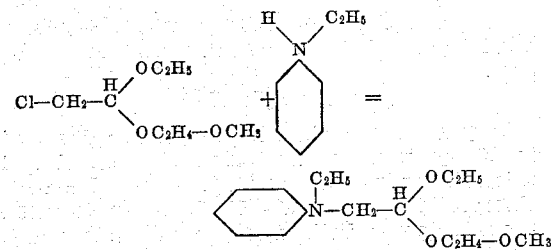

This dye intermediate, when reacted with diazotized p-nitroaniline, gives a red dye which is valuable for dyeing cellulose acetate. This dye intermediate and the dye formed by its reaction with diazotized p-nitroaniline are the inventions of J. G. McNally and J. B. Dickey and are described and claimed in their application Serial Number 215,638, filed June 24, 1938.

Our mixed halogenated acetals are useful for preparing pharmaceuticals. For instance, a valuable hypnotic, having the following formula, results upon reacting α-methoxyethoxy β-chloroethyl ether with barbituric acid:

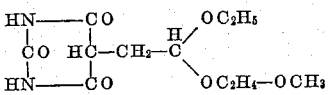

Our mixed halogenated acetals are useful as intermediates for the preparation of various compounds in which an acetal grouping, having unlike branches, is desired. Due to the presence of the easily replaceable halogen, they may be readily reacted with compounds in which linkage takes place at this point, replacing the halogen and forming the halogen acid or its salt as the by-product.

We claim:

1. A mixed halogenated acetal having the formula:

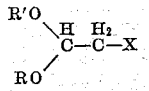

R being an alkyl group, R' being an alkoxy alkyl group and X being a member of the group consisting of bromine and chlorine.

2. A mixed halogenated acetal having the formula:

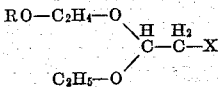

R being an alkyl group and X being a member of the group consisting of bromine and chlorine.

3. α-methoxy ethoxy-β-chloroethyl ether.

4. α - tetrahydrofurfuryloxy - β - chloroethyl ether.

5. A mixed halogenated acetal having the formula:

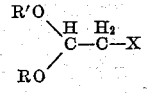

R being an alkyl group, R' being a member of the group consisting of tetrahydrofurfuryl and alkoxy alkyl groups, and X being a member of the group consisting of bromine and chlorine.

6. A mixed halogenated acetal having the formula:

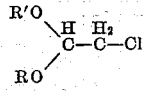

R being an alkyl group and R' being a member of the group consisting of tetrahydrofurfuryl and alkoxy alkyl groups.

JOSEPH B. DICKEY.
JAMES B. NORMINGTON.

CERTIFICATE OF CORRECTION.

Patent No. 2,247,482.  July 1, 1941.

JOSEPH B. DICKEY, ET AL.

It is hereby certified that error appears in the printed specification of the above numbered patent requiring correction as follows: Page 1, first column, line 46, for the words "a group" read --an alkyl group--; same line, for "an aryl," read --a--; and that the said Letters Patent should be read with this correction therein that the same may conform to the record of the case in the Patent Office.

Signed and sealed this 21st day of October, A. D. 1941.

(Seal)

Henry Van Arsdale,
Acting Commissioner of Patents.